United States Patent
Mueller (10) Patent No.: US 7,821,914 B2
(45) Date of Patent: Oct. 26, 2010

(54) METHOD OF GENERATION AND SET OF IMPLEMENTATION EFFICIENT PREAMBLES FOR OFDM SYSTEMS

(75) Inventor: Arndt Joseph Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 134 days.

(21) Appl. No.: 12/167,621

(22) Filed: Jul. 3, 2008

(65) Prior Publication Data

US 2009/0245287 A1 Oct. 1, 2009

Related U.S. Application Data

(60) Provisional application No. 61/040,951, filed on Mar. 31, 2008, provisional application No. 61/055,367, filed on May 22, 2008, provisional application No. 61/061,022, filed on Jun. 12, 2008.

(51) Int. Cl.
*H04J 1/00* (2006.01)
*H04J 11/00* (2006.01)

(52) U.S. Cl. .................. 370/206; 370/470; 370/474; 370/482; 370/485

(58) Field of Classification Search .............. None
See application file for complete search history.

(56) References Cited

U.S. PATENT DOCUMENTS

| | | | |
|---|---|---|---|
| 7,158,541 B2 * | 1/2007 | Sawada et al. ............ 370/513 |
| 7,519,128 B2 * | 4/2009 | Seto et al. ................. 375/267 |
| 7,548,564 B2 * | 6/2009 | Hyun et al. ................ 370/480 |
| 2005/0013381 A1 * | 1/2005 | Suh et al. .................. 375/260 |
| 2007/0230600 A1 * | 10/2007 | Bertrand et al. ............ 375/260 |
| 2007/0248175 A1 * | 10/2007 | Bruninghaus et al. ....... 375/260 |
| 2008/0043650 A1 * | 2/2008 | Jang et al. ................. 370/310 |
| 2008/0080362 A1 * | 4/2008 | Sung ........................ 370/208 |
| 2008/0317150 A1 * | 12/2008 | Alexander et al. .......... 375/260 |
| 2009/0135713 A1 * | 5/2009 | Hwang et al. .............. 370/210 |
| 2009/0147667 A1 * | 6/2009 | Kang et al. ................ 370/203 |
| 2009/0190684 A1 * | 7/2009 | She et al. .................. 375/267 |
| 2009/0213919 A1 * | 8/2009 | Park et al. ................. 375/227 |

* cited by examiner

Primary Examiner—Chi H Pham
Assistant Examiner—Soon-Dong D Hyun
(74) Attorney, Agent, or Firm—Bruce W. Greenhaus; Duane Morris LLP (57) ABSTRACT

In one embodiment, a network node includes a lookup table configured to store one or more of the following frequency domain bit sequences: i) x010101000110xxxxxxx011000000000; ii) x101100011000000011011110xxxxxxxxxxxxx0110111001101001010111010; iii) x001101101111101001110111xxxxxxxxxxxxx0111010010111110000000101; iv) x000000011000100110100100xxxxxxxxxxxxx1011011110000110101011100; and v) x100001000011011110000110xxxxxxxxxxxxx1100110011101101111110110. The node includes a processing channel configured to generate a preamble including at least one of the frequency domain bit sequences, and a transmitter configured to transmit the preamble and a data packet over a communication channel.

23 Claims, 6 Drawing Sheets

METHOD OF GENERATION AND SET OF IMPLEMENTATION EFFICIENT PREAMBLES FOR OFDM SYSTEMS

CROSS-REFERENCE TO RELATED APPLICATIONS

This application claims priority to U.S. Provisional Application No. 61/040,951 filed Mar. 31, 2008; U.S. Provisional Application No. 61/055,367 filed May 22, 2008; and U.S. Provisional Application No. 61/061,022 filed Jun. 12, 2008, each of which is herein incorporated by reference in its entirety.

FIELD

The disclosed system and method relate to the transmission of data, and more particularly, the disclosed system and method relate to generating spectrally efficient preambles in an OFDM network.

BACKGROUND

Figure 2:
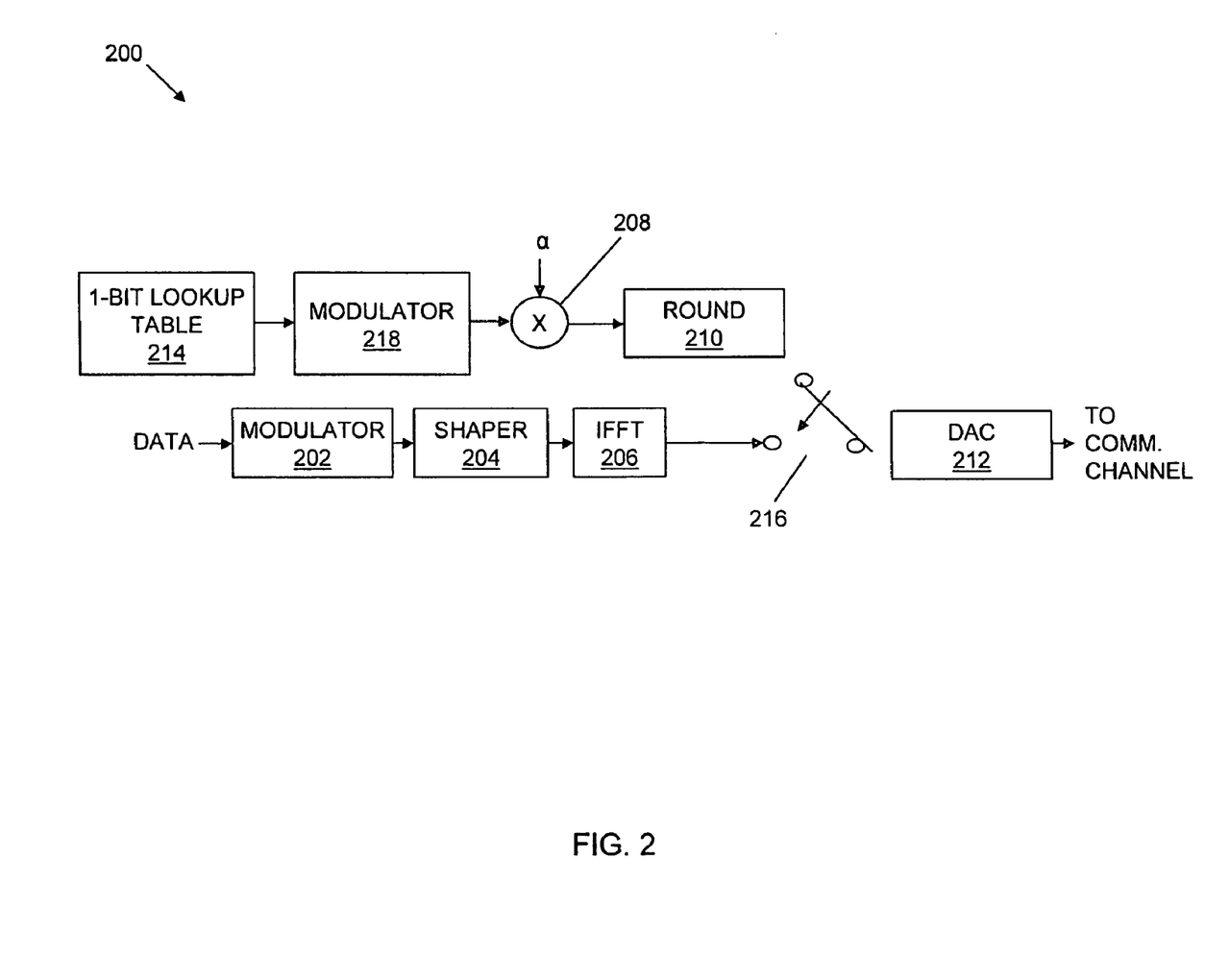
FIG. 2 illustrates a conventional processing channel in a MoCA network.

In a conventional Multimedia Over Coaxial Alliance (MoCA) network, data packets are transmitted over a coaxial communication channel having a bandwidth of 50 MHz. FIG. 2 illustrates a conventional transmission processing channel 200 in a MoCA node. As shown in FIG. 2, data is first modulated at a modulator 202. Modulator 202 typically modulates the data using a high order modulation technique such as 16-bit quadrature amplitude modulation (16-QAM), 32-QAM, 64-QAM, 128-QAM, or 256-QAM. The modulated data is then power loaded and shaped at shaper 204 such that the signal spectrum exhibits an x/(sin x) frequency characteristic. Power loading includes adding power to particular subcarriers to compensate for the power roll off that occurs prior to transmission at the digital-to-analog converter (DAC) 212. After power loading and shaping, the data is transformed into the time domain using an Inverse Fast Fourier Transform (IFFT) 206. The output of the IFFT has 10-bit per sample precision which is input to a digital-to-analog converter (DAC) 212 to convert the data from a digital signal to an analog signal so it may be transmitted over the communication channel.

Figure 1:
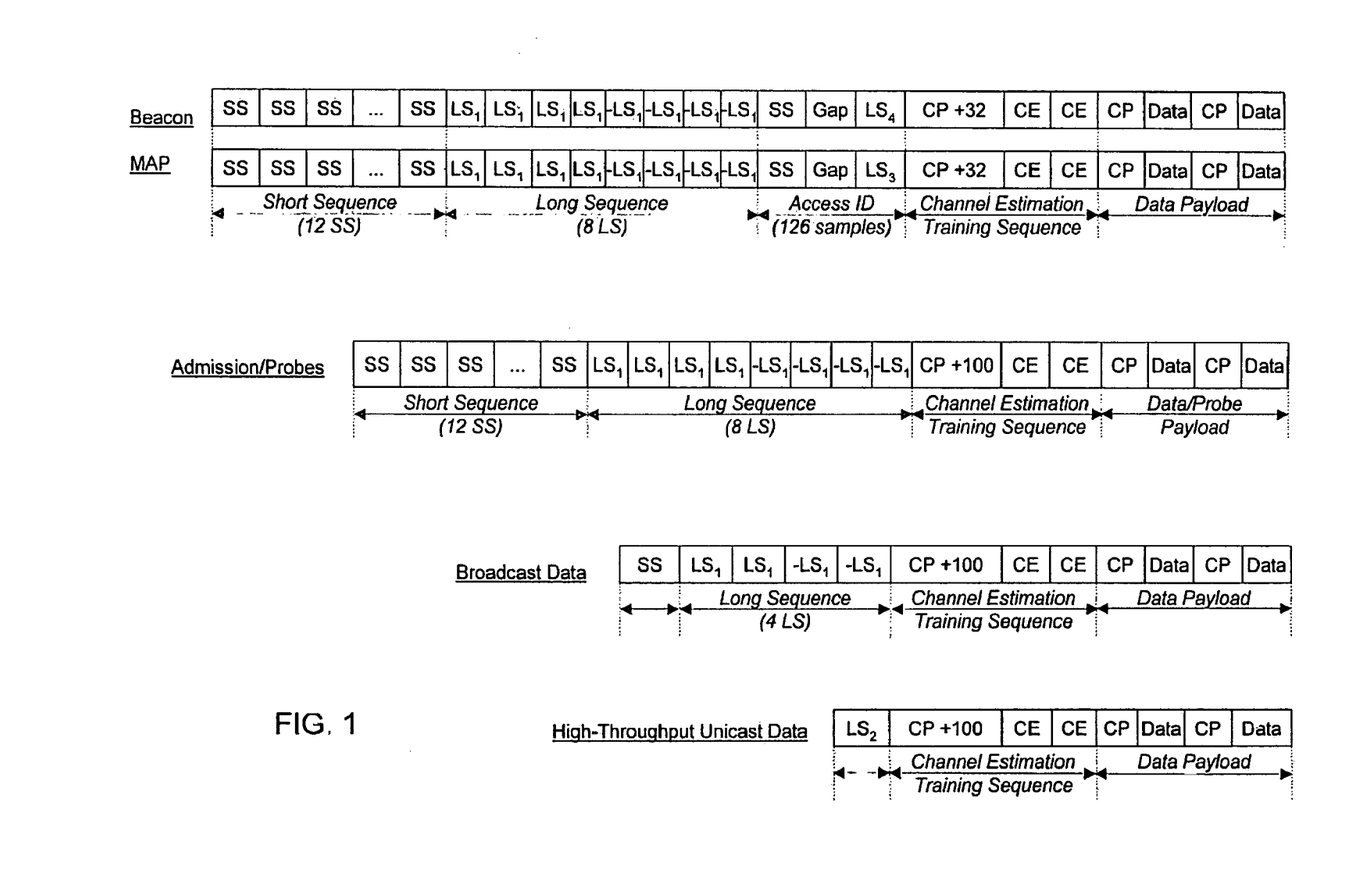
FIG. 1 illustrates a set of preambles in a MoCA network.

Each data packet in a conventional MoCA network has a payload. A preamble is typically appended to the data packet. The preambles are used to calibrate the receiver to receive the following data with the appropriate gain and frequency compensation. The preambles are also used by the receiver to determine when the first OFDM symbol of the payload will be received at the receiver. FIG. 1 illustrates the five unique preambles of four different lengths that are utilized in MoCA networks. The preamble lengths are varied to maximize the available bandwidth for data transmission. As shown in FIG. 1, the two most robust preambles are the Beacon preamble and the MAP preamble. The Beacon and MAP preambles are the most robust and least efficient preambles because they are used for network coordination and contain the most critical information. The second most robust preamble type is the Admission Probes preamble. This preamble is used by a transmitter to accommodate a receiver that has little-to-no a-priori information about the link over which the transmitter will transmit data. The second most efficient preamble is the Broadcast/Data preamble. The Broadcast/Data preamble is used to transfer data from a transmitter to one or more receivers and assumes the receiving node has some a-priori information about the link. The most efficient, and thus shortest, preamble is the High-Throughput Unicast Data preamble. This preamble is appended to the beginning of a data packet when the receiver has a substantial amount of a-priori information about the communication channel.

As shown in FIG. 1, each of these five preambles is formed from five unique components. There are four long components, L1, L2, L3, and L4, and one short component, SS. Each of the long components is a 64-bit binary phase shift key (BPSK) modulated time domain bit sequence, and the short component is a 30-bit BPSK time domain bit sequence. The short sequence is the first component of a generic preamble and may be used by a receiving node to adjust the automatic gain control. Two of the long sequences, L1 and L2, may be used to finalize the automatic gain control adjustment, to perform burst detection, and to estimate the frequency offset between the transmitting node and the receiving node. The other two long sequences, L3 and L4, are used to identify link control packets to perform network coordination, admission, and maintenance. These components are generated in the time domain by modulating the following binary sequences:

$$S = \{0,1,1,1,0,0,0,0,1,0,0,0,0,1,1,1,1,1,0,0,0,1,0,0,1,1,1,1,1,0\}$$

$$L1 = \left\{ \begin{matrix} 0,0,0,0,0,0,1,0,1,0,1,0,0,1,1,0,0,1,0,0,0,1,0,0,1,0,1,1,0,1,1,0, \\ 0,0,1,1,1,0,1,0,0,0,0,1,1,0,1,0,1,1,1,0,0,1,1,1,1,0,1,1,1,1,1,0 \end{matrix} \right\}$$

$$L2 = \left\{ \begin{matrix} 1,0,1,1,1,0,0,1,1,1,1,0,1,1,1,1,1,0,0,0,0,0,0,1,0,1,0,1,0,0,1,1, \\ 0,0,1,0,0,0,1,0,0,1,0,1,1,0,1,1,0,0,0,1,1,1,0,1,0,0,0,0,1,1,0,1 \end{matrix} \right\}$$

$$L3 = \left\{ \begin{matrix} 1,1,0,1,0,1,0,1,1,1,0,0,1,1,0,0,0,0,0,1,0,0,0,1,0,1,0,0,1,0,1,1,0, \\ 0,1,0,0,1,1,1,1,0,1,1,0,1,1,1,1,1,0,0,0,0,1,1,1,1,1,0,1,0,0,0,0,0,0,1 \end{matrix} \right\}$$

$$L4 = \left\{ \begin{matrix} 1,0,0,1,0,1,1,1,1,0,1,1,1,1,1,0,1,0,0,1,1,0,1,0,1,0,1,1,0,1,1,0,0,0,0, \\ 0,1,1,1,1,1,0,0,1,0,0,0,1,1,0,0,1,1,1,0,0,0,1,0,1,0,0,0,0,0,0,0,1 \end{matrix} \right\}$$

Conventional MoCA nodes store these binary sequences in a lookup table 214 as shown in FIG. 2. To append a preamble to the beginning of a data packet, each preamble component is accessed from the lookup table 214. Each component is π/4 binary phase-shift keying (BPSK) modulated as a time domain signal at modulator 218. For example, a zero in the binary sequence lookup table 214 gets mapped to a 1+j complex constellation point and a one in the binary sequence lookup table gets mapped to a −1−j complex constellation point. The component is multiplied by a scale factor α at multiplier 208 to ensure that the preamble power is scaled to the appropriate value relative to the data portion of the packet. The scaled component is rounded at rounding block 210 to match the preamble to the bit per sample precision of the DAC 212, which is 10-bits. Once the preamble has been generated, switch 216 will change orientations so it will pass the data from IFFT 206 to DAC 212.

In the conventional MoCA network with a 50 MHz bandwidth, generating π/4 BPSK modulated preambles in the time domain by accessing the components stored in the preamble sequence lookup table 214 is sufficient to calibrate a receiver. However, as the bandwidth of a MoCA network is constrained below 50 MHz, generating a preamble using time domain modulation is inadequate to accurately represent the spectrum of the data at a receiver because the time domain nature of the preamble generation does not enable spectral shaping. As a result of the preamble's poor spectral representation of the data portion of the packet, the receiver calibration will suffer and data will be lost.

Accordingly, a method for generating a spectrally compliant preamble in a MoCA network with a reduced bandwidth is desired.

SUMMARY

In one embodiment, a method of transmitting a data packet comprises a) generating a preamble derived from one or more of the following bit sequences: i) x010101000110xxxxxxx011000000000; ii) x101100011100000001101110xxxxxxxxxxxxx01101110 01101001010111010; iii) x001101101111010011101111xxxxxxxxxxxxx01110100 10111110000000101; iv) x000000011000100110100100xxxxxxxxxxxxx10110111 10000110101011100; and v) x100001000011011110000110xxxxxxxxxxxxx11001100 11101101111110110; b) appending the preamble to the data packet; and c) transmitting the data packet and preamble over a communication channel, wherein "x" represents an unused sub-carrier in a transmitted frequency division multiplexed signal.

In one embodiment, a method for transmitting a data packet comprises a) generating a preamble by accessing a lookup table having elements corresponding to a modulated complex time domain representation of a frequency domain bit sequence. The elements are stored in the lookup table with Y-bit per sample precision. A real part of the elements is stored in the lookup table as: 6, −7, 8, −2, −12, 15, 1, −15, 8, 7, −7, −4, 12, −4, −7, 7, 8, −15, 1, 15, −12, −2, 8, −7, 6, 2, −16, −15, −16, 2; and an imaginary part of the elements is stored in the lookup table as: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13. The method includes b) converting the elements from the lookup table to a Z-bit per sample precision. The Z-bit per sample precision is greater than the Y-bit per sample precision. The method includes c) appending the preamble including the modulated complex time domain representation of the frequency domain bit sequence to the data packet, and d) transmitting the data packet and preamble over the communication channel.

In one embodiment, a method for transmitting a data packet comprises a) generating a preamble by accessing a lookup table having elements corresponding to a modulated complex time domain representation of a frequency domain bit sequence. The elements are stored in the lookup table with Y-bit per sample precision. A real part of the elements is stored in the lookup table as: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3; and an imaginary part of the elements is stored in the lookup table as: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6. The method includes b) converting the elements from the lookup table to a Z-bit per sample precision. Z-bit per sample precision is greater than the Y-bit per sample precision. The method includes c) appending the preamble including the modulated complex time domain representation of the frequency domain bit sequence to the data packet; and d) transmitting the data packet and preamble over the communication channel.

In one embodiment, a method for transmitting a data packet comprises a) generating a preamble by accessing a lookup table having elements corresponding to a modulated complex time domain representation of a frequency domain bit sequence. The elements are stored in the lookup table with Y-bit per sample precision. A real part of the elements is stored in the lookup table as: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8, and an imaginary part of the elements is stored in the lookup table as: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15. The method includes b) converting the elements from the lookup table to a Z-bit per sample precision. Z-bit per sample precision is greater than the Y-bit per sample precision. The method includes c) appending the preamble including the modulated complex time domain representation of the frequency domain bit sequence to the data packet, and d) transmitting the data packet and preamble over the communication channel.

In one embodiment, a method for transmitting a data packet comprises a) generating a preamble by accessing a lookup table having elements corresponding to a modulated complex time domain representation of a frequency domain bit sequence. The elements are stored in the lookup table with Y-bit per sample precision. A real part of the elements is stored in the lookup table as: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10, and an imaginary part of the elements is stored in the lookup table as: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12. The method includes b) converting the elements from the lookup table to a Z-bit per sample precision. Z-bit per sample precision is greater than the Y-bit per sample precision. The method includes c) appending the preamble including the modulated complex time domain representation of the frequency domain bit sequence to the data packet, and d) transmitting the data packet and preamble over the communication channel.

In one embodiment, a method for transmitting a data packet comprises a) generating a preamble by accessing a lookup table having elements corresponding to a modulated complex time domain representation of a frequency domain bit sequence. The elements are stored in the lookup table with Y-bit per sample precision. A real part of the elements is stored in the lookup table as: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2, and an imaginary part of the elements is stored in the lookup table as: 0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15. The method includes b) converting the elements from the lookup table to a Z-bit per sample precision. Z-bit per sample precision is greater than the Y-bit per sample precision. The method includes c) appending the preamble including the modulated complex time domain representation of the frequency domain bit sequence to the data packet, and d) transmitting the data packet and preamble over the communication channel.

In one embodiment, a network node comprises a lookup table configured to store one or more of the following frequency domain bit sequences: i) x010101000110xxxxxxx011000000000; ii) x101100011100000001101110xxxxxxxxxxxxx01101110

01101001010111010; iii)
x00110110111110100111011111xxxxxxxxxxxxx01110100
10111110000000101; iv)
x0000000110001001101001000xxxxxxxxxxxxx10110111
11000110101011100; and v)
x10000100001101111000001 10xxxxxxxxxxxxx11001100
11101101111110110. The node includes a processing channel configured to generate a preamble derived from at least one of the frequency domain bit sequences, and a transmitter configured to transmit the preamble and a data packet over a communication channel.

In one embodiment, a network node comprises a lookup table configured to store one or more of the following modulated complex time domain sample sequences with Y-bit per sample precision: SSI: 6, −7, 8, −2, −12, 15, 1, −15, 8, 7, −7, −4, 12, −4, −7, 7, 8, −15, 1, 15, −12, −2, 8, −7, 6, 2, −16, −15, −16, 2; SSQ: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13; L1I: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3; L1Q: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6; L2I: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8; L2Q: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15; L3I: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −4, −5, 10, −6, −11, −14, −10, 12, 6, −6, 4, 11, 1, −12, 2, 15, 1, 0, 8, 10; L3Q: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12; L4I: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2; and L4Q: 0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15. SSI and SSQ correspond to the real and imaginary components derived from bit sequence i. L1I and L1Q correspond to the real and imaginary components derived from bit sequence ii. L2I and L2Q correspond to the real and imaginary components derived from bit sequence iii. L3I and L3Q correspond to the real and imaginary components derived from bit sequence iv. L4I and L4Q correspond to the real and imaginary components derived from bit sequence v. The node includes a processing channel configured to generate a preamble having Z-bit per sample precision. The preamble includes at least one of the modulated complex time domain sample sequences. The node includes a transmitter configured to transmit the preamble and a data packet over a communication channel.

DETAILED DESCRIPTION

Figure 3:
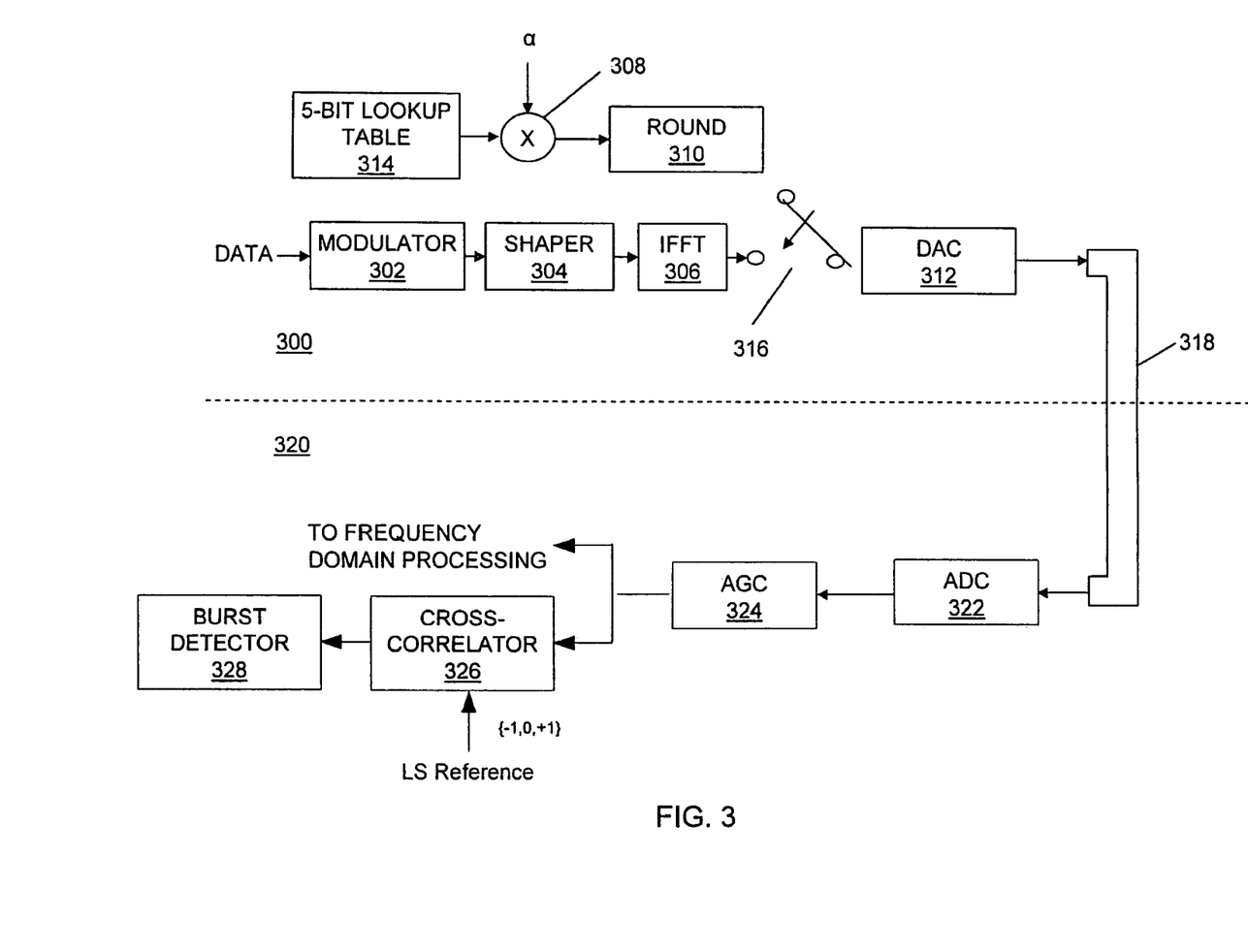
FIG. 3 illustrates one example of transmission and receiver processing channels in a MoCA network.

A method of generating and implementing spectrally efficient preambles in a coaxial network having a bandwidth below 50 MHz is now described. FIG. 3 illustrates one example of a simplified transmission 300 and receiver 320 processing channels in a MoCA network. Transmission processing channel 300 is used to append a preamble to a data packet and transmit the preamble and data over a communication channel 318. Transmission processing channel 300 includes a modulator 302, shaper 304, and an IFFT 306, which are used to process the data. Transmission processing channel 300 also includes a 5-bit per sample precision lookup table 314 which may be used instead of a lookup table with i-bit per sample precision to store the transformed complex representations of the frequency domain bit sequences of preamble components L1, L2, L3, L4, and SS. The 5-bit per sample precision provides enough flexibility with the 32 different voltage levels (e.g., $2^5=32$) to effectively calibrate the receiver in a network having a 40 MHz bandwidth. Transmission processing channel 300 further includes a multiplier 308 and a rounding block 310 connected to the lookup table 314. In some embodiments, multiplier 308 scales the components by a 6-bit scale factor ranging from 0 to 15.75, although other scale factors may be used. The scaled components are rounded at rounding block 310 to convert the preamble to 10-bit per sample precision to match the sensitivity of the DAC 312, which has 10-bit per sample precision. In some embodiments, the components are rounded by using a symmetric arithmetic rounding technique in which 0.5 is added to the value to be rounded and the fractional digits are then discarded. Note that although 5-bit per sample precision and 10-bit per sample precision are discussed with respect to the lookup table and DAC sensitivities, other bit per sample precisions may be used. A switch 316 is operable to connect the output of the rounding block 310 to the DAC 312 in a first orientation and to connect the output of the IFFT to the DAC in a second orientation.

To transmit a data packet with a preamble appended to the beginning of the packet the switch is connected to the output of rounding block 310. Preamble components stored in the lookup table 314 are accessed and scaled to 10-bit per sample precision and passed to the DAC 312. Once the preamble has been generated, switch 316 will change orientations to pass the data to the DAC 312.

The frequency domain bit sequences for SS, L1, L2, L3, and L4 cannot be selected at random as each component of the preamble performs a specific function in a MoCA network. Accordingly, each preamble component not only needs to be selected with minimal quantization error so it may be stored as in a lookup table with 5-bit per sample precision, but each preamble component must be able to be distinguished from one another by a receiver so that the receiver can determine which preamble it is receiving. For example, a receiver needs to be able to distinguish long component L3 from long component L4 so it can determine if it is receiving a Beacon preamble or a MAP preamble as shown in FIG. 1.

Long Components L1 and L2

In a MoCA network, long components L1 and L2 are used to calibrate a receiver. Specifically, long components L1 and L2 are used by a receiver 320 by the automatic gain control 324 to adjust the gain and by a burst detector 328 to validate when a data packet has arrived at receiver 320. To set the gain, the automatic gain controller of the receiver processing channel 320 measures the energy of the received preamble and sets the appropriate gain to ensure that the dynamic range the data portion of the packet fits within the dynamic range of the analog to digital converter (ADC) 322. Accordingly, the preamble should have similar, if not identical, spectral characteristics to the payload including any shaping due to power loading so that the data will be accurately processed by receiver processing channel 320.

The burst detector 328 of receiver processing channel 320 performs burst detection to detect the presence of a long component L1 on the communication channel. In a MoCA network, burst detection is performed by observing a succession of linearly increasing peaks from the cross-correlator 326. The cross-correlator 326 compares a stored 2-bit quantized reference of each of the long sequences with the incoming sequences as they are output by the analog-to-digital converter 322. In some embodiments, the quantized reference may be a −1, 0, or a +1 as −2 is not used. A cross-correlation is performed by multiplying each 2-bit value of the stored quantized reference by the corresponding sample of the received quantized sequence. Once each sample of the received signal has been multiplied by its corresponding 2-bit value in the quantized reference, the 64 products are summed together. If the sum is a large number, then there is a good cross-correlation and if the sum is a small number, then there is a poor cross-correlation.

Accordingly, three primary considerations should be considered to develop long sequences L1 and L2. First, of the 2^50 possible frequency domain bit sequences that can be used for L1 and L2, the modulated time domain representation of L1 and L2 should be able to be quantized as 5-bit real and imaginary numbers with minimal loss of information. Note that although each frequency domain bit sequence is considered 64-bits in length, there are a number of subcarriers that cannot be used in the reduced 40 MHz bandwidth and thus the total number of combinations is reduced from 2^64 to 2^50. Thus, the total number of possible combinations is reduced by the number of available subcarriers. Second, when received by a receiver, the long sequences L1 and L2 should cross-correlate well with a 2-bit (e.g., −1, 0, +1) stored reference so that the sequence is easily detected by the receiver. Third, the long sequences L1 and L2 should cross-correlate poorly with each other's stored 2-bit reference to prevent false detection.

To determine the frequency domain bit sequences for L1 and L2, a sample of 50,000 64-bit frequency domain bit sequences was randomly generated numerous times and tested as follows. For each of the 64-bit frequency domain bit sequences, every fourth carrier in the available bandwidth was modulated using BPSK. Put another way, once the 64 bits were generated, the 14 bits that map to the unused sub-carriers were masked out using an 'x'. A zero was BPSK encoded to a +1+j0 complex point, a one was encoded to a −1+j0 complex point, and an 'x' was an unused entry which remained unencoded as a 0+j0 value. These values (e.g., +1+j0, −1+j0, and 0+j0) were mapped to every fourth sub-carrier starting with the left most value being mapped to the 0-th frequency or DC sub-carrier, and the right most value being mapped to the 63×4=252 sub-carrier. Each frequency that is not a multiple of four was encoded with 0+j0.

The modulated sequence was power loaded or shaped using x/sin x shaping to account for the power roll off that occurs at high frequencies at the DAC 312. The modulated and shaped signals were then transformed by a 256-point IFFT to acquire the 256 sample time domain equivalent. As a consequence of only using every fourth sub-carrier, the 256-sample time domain complex sequence consisted of four identical 64-sample segments. The output of the IFFT for each of the 64-bit frequency domain bit sequences was analyzed to determine which could be best represented with the least amount of quantization error due to rounding. To achieve this, the complex time domain representations of the 64 bit frequency domain bit sequences were scaled by a 6-bit scale factor ranging from 0 to 15.75 and analyzed to determine which could be represented by a 5-bit number with the least amount of quantization error. Put another way, for each of the 64-bit frequency domain bit sequences that were modulated, power loaded, and transformed to the time domain, the output of the IFFT was analyzed to determine which output clustered best around 32 equally spaced voltage levels and thus could effectively be represented as a 5-bit number with minimal loss of information. Out of the numerous samples of 50,000 64-bit frequency domain bit sequences that were randomly generated, the 1,000 bit sequences whose time domain equivalent exhibited the lowest quantization error were selected and stored.

The 1,000 stored sequences were then analyzed to determine which of the sequences had the best cross-correlation properties with its quantized reference. Two techniques were utilized to generate a quantized reference of the sequences. The first reference generation technique quantized the real and imaginary components of the 64 sample complex time domain representation of the frequency-domain bit sequences to a −1, 0, or +1 based on the sign of the sample. This reference generation technique resulted in each sample being quantized to a +1 or −1 unless the sample was a zero. The second technique utilized to generate a quantized reference of the sequences used a threshold value to determine if a bit should be a −1, 0, or +1. For example, if the absolute value of the bit was above the threshold value, then it was quantized to a +1 or −1, but if the absolute value of the bit was below the threshold value, then it was quantized to a zero. The threshold was selected to minimize the quantization error between the 64-sample time domain complex sequence and the reference.

Once the 5-bit quantized references were generated and stored, each of the 1,000 complex time domain representations were cross-correlated against the 2-bit quantized references. As described above, a MoCA receiver quantizes incoming data at the analog-to-digital converter (ADC) 322 to a 10-bit number. The received sequence is then compared to the quantized and stored reference of the sequence. To perform a cross-correlation, each of the 64 samples of the stored reference sequence is multiplied by the corresponding sample of the received quantized sequence. Once each sample has been multiplied, the 64 products of the multiplication are summed together. If the sum is a large number, then the sequence has good cross-correlation with its reference, but if the sum is a small number then the sequence cross-correlates poorly with its reference.

Figure 4A:
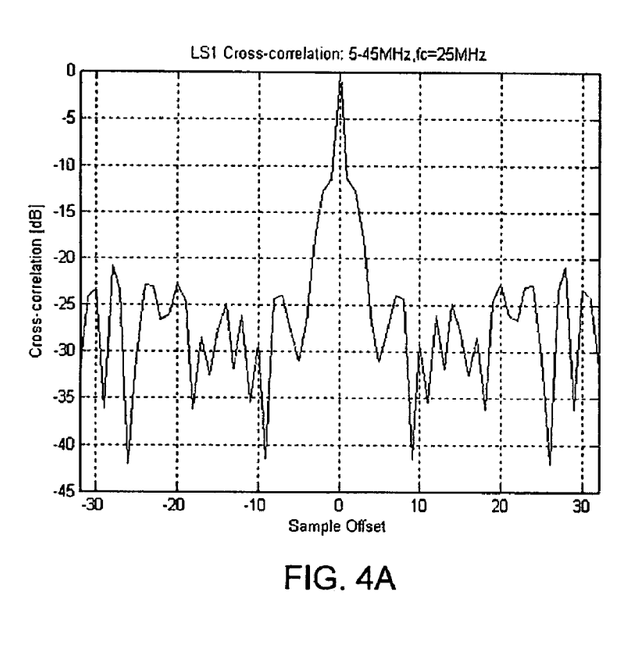
FIG. 4A illustrates one example of good cross-correlation between a received long sequence L1 and a quantized stored reference of L1.

FIG. 4A illustrates one example of a cross-correlation. The large peak that extends to 0 dB is when the bit sequence has a good cross-correlation with its stored reference. As shown in FIG. 4A, when the bit sequence does not correlate well with its stored reference, the highest peak is 10 dB less than the good correlation peak. To accurately select the best cross-correlation, a reference value of −23 dB was selected and the area above the threshold value and below cross-correlation value was calculated. Out of the 1,000 bit sequences that were tested, 25 bit sequences with the lowest area of above the threshold value and below the cross-correlation value were selected and stored.

Figure 4B:
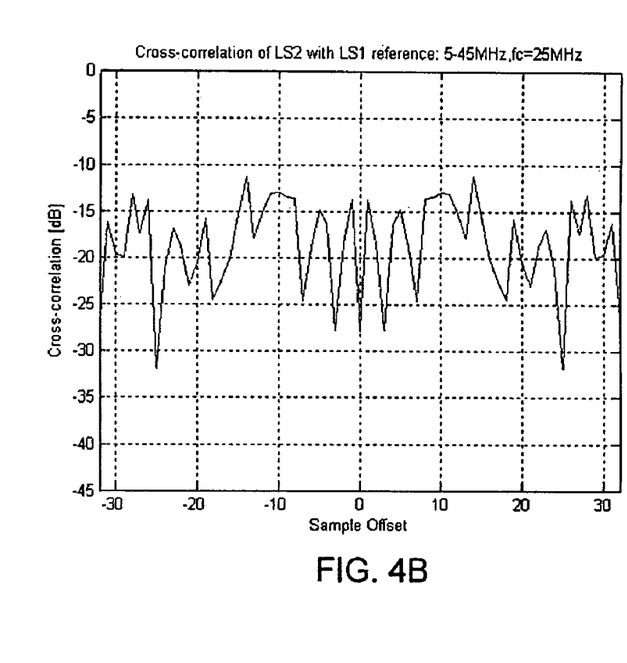
FIG. 4B illustrates one example of the cross-correlation of a receiver receiving long sequence L2 when expecting to receive long sequence L1.

The 25 stored bit sequences were then analyzed to determine which two sequences had the worst cross-correlation with each other. FIG. 4B illustrates one example of a cross-correlation when a receiver is expecting to receive long sequence L1 and instead receives a long sequence L2. As shown in FIG. 4B, the cross-correlation of a quantized reference of long sequence L1 against a received long sequence L2 is 10 dB below the cross-correlation of a received long sequence L1 and its stored quantized reference. Once the two sequences with the lowest cross-correlation with each other were determined, they were set and stored as L1 and L2. The frequency domain values of L1 and L2 are as follows:

L1:
x1011000111000000011011110xxxxxxxxxxxxx0110111001101001010111010

L2:
x0011011011111010011101111xxxxxxxxxxxxx0111010010111110000000101

Where,
the left-most bit is bit 1;
bits 1-32 represent subcarriers 0, 4, 8 . . . 124, respectively;
bits 33-64 represent subcarriers −128, −124, −120, . . . −4, respectively; and
"x" represents an unused subcarrier.

Once the frequency domain bit sequences for L1 and L2 were identified, they were modulated, power loaded, and transformed to the time domain by an IFFT. The complex real and imaginary outputs of the IFFT were then each quantized to 5-bits and stored in a lookup table having 5-bit per sample precision. The modulated complex time domain bit representations of the 64-bit frequency domain bit sequences for preamble components L1 and L2 are as follows:

L1I: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −, −5, 2, −16, −7, 5, 6, 12, 0, 0, 0, −9, 11, 11, −14, −5, 3

L1Q: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6

L2I: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 12, −3, 0, 9, −8, −2, 7, 8, 13, −13, −15, 6, −1, 12, 8

L2Q: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15

Where,
L1I is the real components of the modulated complex time domain representation of the 64-bit frequency domain bit sequence L1;
L1Q is the imaginary components of the modulated complex time domain representation of the 64-bit frequency domain bit sequence L1;
L2I is the real components of the modulated complex time domain representation of the 64-bit frequency domain bit sequence L2; and
L2Q is the imaginary components of the modulated complex time domain representation of the 64-bit frequency domain bit sequence L2.

Long Components L3 and L4

Long components L3 and L4 are used by a MoCA receiver to determine the identity of the packet. Specifically, long components L3 and L4 are used by a receiver to determine if the incoming packet will be a Beacon or a MAP because the preambles used for a Beacon and a MAP only differ by the inclusion of the preamble component L3 in the MAP and preamble component L4 in the Beacon.

Accordingly, three primary considerations were taken into account when developing the frequency domain bit sequences for long sequences L3 and L4. First, of the 2^50 possible frequency domain bit sequences that could be used for L3 and L4, the complex time domain representation of L3 and L4 should have minimal quantization error when quantized to 5-bit real and imaginary numbers. Second, when received by a receiver, the long sequences L3 and L4 should cross-correlate well with its stored reference, e.g., −1, 0, or +1, so that it is easily detected by the receiver. Third, the long sequences L3 and L4 should cross-correlate poorly with the stored reference of the other component to prevent false detection.

As described above, numerous samples of 50,000 64-bit frequency domain bit sequences were generated. The 64-bit frequency domain bit sequences were modulated, shaped, and transformed to the time domain as described above. The complex time domain representations of the 64 bit frequency domain bit sequences were then scaled by a 6-bit scale factor ranging from 0 to 15.75 and analyzed to determine which could be represented by a 5-bit number with the least amount of quantization error. Out of the numerous samples of 50,000 64-bit frequency domain bit sequences that were randomly generated, the 1,000 bit sequences with the lowest quantization error were selected and stored.

Figure 5A:
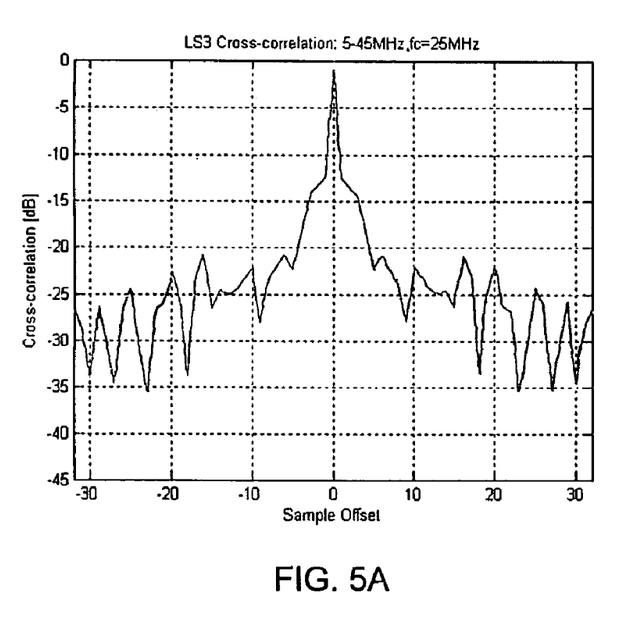
FIG. 5A illustrates one example of good cross-correlation between a received long sequence L3 and a quantized stored reference of L3.

The stored sequences were then analyzed to determine which of the sequences had the best cross-correlation properties with its 2-bit quantized reference. Two reference generation techniques were utilized. The first reference generation technique quantized the time domain complex sequence samples to −1, 0, or +1 based on the sign of the sample and thus each sample was quantized to a +1 or −1, unless the sample was a zero. The second reference generation technique utilized a threshold value. If the absolute value of the sample was above the threshold value, then it was quantized to a +1 or −1, but if the absolute value of the sample was below the threshold value, then it was quantized to a zero. Out of the 1,000 bit sequences that were tested, the 25 bit sequences with the best cross-correlation characteristics of their time domain representations with their own 2-bit quantized reference were selected and stored. FIG. 5A illustrates one example of a good cross-correlation between a stored 2-bit quantized reference for long component L3 and a received long component L3.

Figure 5B:
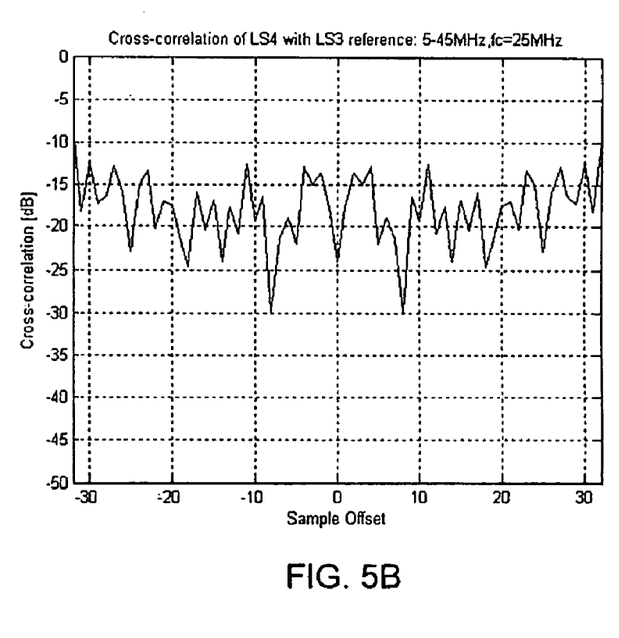
FIG. 5B illustrates one example of the cross-correlation of a receiver receiving long sequence L3 when expecting to receive long sequence L4.

The 25 stored bit sequences were then analyzed to determine which two sequences had the worst cross-correlation with each other's reference. Once the two sequences with the lowest cross-correlation value with each other were determined, the sequences were set as L3 and L4. FIG. 5B illustrates one example of a low cross-correlation value that occurs when the receiver is expecting to receive long component L3 and instead receives a long component L4. The frequency domain values of preamble components L3 and L4 are as follows:

L3:
x0000000000001100010000000xxxxxxxxxxxx1011011110000110101011100

L4:
x1000010000110111100000110xxxxxxxxxxxx1100110011101101111110110

Where,
the left-most bit is bit 1;
bits 1-32 represent subcarriers 0, 4, 8 . . . 124, respectively;
bits 33-64 represent subcarriers −128, −124, −120, . . . −4, respectively; and
"x" represents an unused subcarrier.

Once the frequency domain bit sequences for L3 and L4 were identified, they were modulated, power loaded, and transformed to the time domain by an IFFT. The real and imaginary outputs of the IFFT was each quantized to 5-bits and stored in a lookup table having 5-bit per sample precision. The modulated complex time domain representations of the 64 bit frequency domain bit sequences for L3 and L4 are as follows:

L3I: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10

L3Q: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12

L4I: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2

L4Q: 0, 15, 10, 15, 13, −5, −10, 3, 6, −4, 11, 6, −15, −1, −11, −12, 14, −4, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15

Where,
L3I is the real components of the modulated complex time domain representation of the 64-bit frequency domain bit sequence L3;
L3Q is the imaginary components of the modulated complex time domain representation of the 64-bit frequency domain bit sequence L3;
L4I is the real components of the modulated complex time domain representation of the 64-bit frequency domain bit sequence L4; and
L4Q is the imaginary components of the modulated complex time domain representation of the 64-bit frequency domain bit sequence L4.

Short Component (SS)

Figure 6:
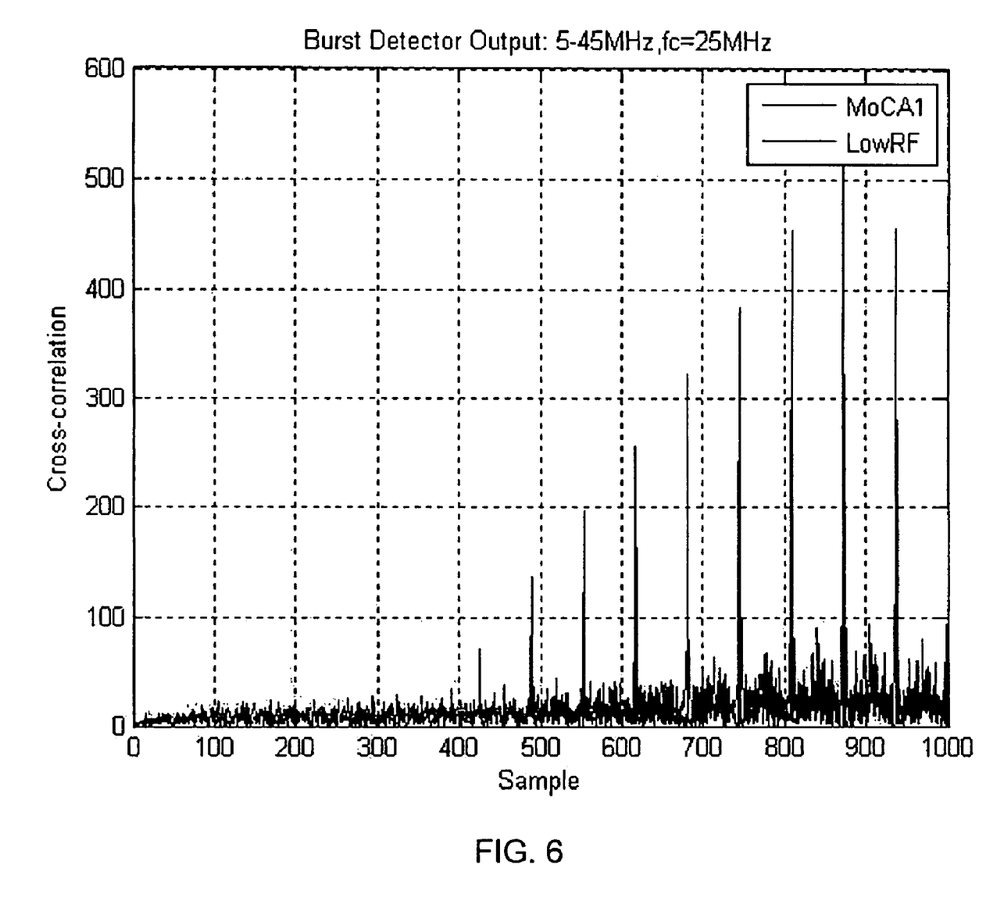
FIG. 6 illustrates one example of an output of a burst detector of a MoCA receiver as it receives a series of long sequences L1.

In a MoCA network, the short component SS is used by the automatic gain controller to initially adjust the gain of the receiver. As described above, long sequence L1 may also be used to adjust the gain, and as shown in FIG. 1, long sequence L1 is always preceded by a short component SS. However, L1 is also used for burst detection to detect when a packet has arrived at the receiver. A MoCA receiver determines a packet has arrived when the output of the burst detector 328 identifies a cross-correlation peak above a threshold value every 64 samples for eight consecutive times. These eight peaks correspond to a good cross-correlation of eight consecutive L1 long sequences. FIG. 6 illustrates one example of a burst detector output detecting eight consecutive peaks. As shown in FIG. 6, the peaks increase linearly as the window of the burst detector 328 is 512 samples, and thus each peak detected within the window is added to the previous cross-correlation value. After the eight peaks are detected, the cross-correlation value of the burst detector 328 will linearly decrease as the first cross-correlation leaves the 512 sample window.

Accordingly, in developing the new short component SS, there were two primary considerations. First, the complex time domain representation of the 32-bit frequency domain bit sequence should have minimal quantization error when quantized to 5-bits. Second, when received by a MoCA receiver, the short component SS should have a low cross-correlation value with the stored 2-bit quantized reference of long sequence L1 to prevent a premature detection of a packet arrival.

To determine the frequency domain bit sequence for the short component SS, numerous samples of 50,000 32-bit frequency domain bit sequences were randomly generated. The eight bits that map to unused sub-carriers were masked out leaving a possible 2^24 different combinations. Each set of 50,000 frequency domain bit sequences were BPSK modulated. For each of the 32-bit frequency domain bit sequences, every eighth carrier in the available bandwidth was modulated. The output of the modulation was then transformed into the time domain by a 256-point IFFT, which would output 8 identical sequences of 32 samples. One of the 8 sequences output from the IFFT was selected and truncated to 30 samples. Since the IFFT outputs a sequence with 32 samples, for every sequence there were several possible sequences that could be selected to comprise the 30 sample sequence. For example, the output of the IFFT would generate a sequence having samples 1-32, and since only 30 samples were needed, samples 1 to 30 could be selected, 2 to 31 could be selected, or 3 to 32 could be selected. The 1,000 sequences with the lowest quantization error when quantized as 5-bits in the time domain were selected from the numerous 50,000 32-bit frequency domain bit sequences that were randomly generated and tested.

Each set of 1,000 was then tested to determine which sequence had the worst cross-correlation against the stored reference of long component L1. Additionally, each short component SS output from the IFFT may be cyclically rotated to minimize the cross-correlation with the long sequence L1 reference. Accordingly, in addition to testing each sequence to determine which had the lowest cross-correlation value with the long sequence L1 reference, each cyclic shift of the output of the IFFT was also tested to determine which component provided the lowest cross-correlation value with the stored 2-bit quantized reference for long component L1. The short component with the lowest cross-correlation value with the stored 2-bit reference for the L1 component was determined. The 32-bit frequency domain bit sequence for short component SS is as follows:

x010101000110xxxxxxx011000000000

Where,
the left-most bit is bit 1;
bits 1-16 represent sub-carriers 0, 8, 16 . . . 112, 120, respectively;
bits 17-32 represent subcarriers −128, −120, −112, . . . −8, respectively; and
"x" represents an unused subcarrier.

The short sequence was selected from the 32 sample time domain equivalent of the 32 bit frequency domain sequence by dropping the first and last samples. The resulting 30 sample sequence was then cyclically rotated so that the sequence started with the 19$^{th}$ sample in the original sequence with the first following the 30$^{th}$ sample. For example, the sequence before the cyclic shift was [1 2 3 4 . . . 29 30] and the sequence after the cyclic shift was [19 20 . . . 29 30 1 2 . . . 17 18]. Once the frequency domain bit sequence for SS was identified, it was modulated, power loaded, and transformed to the time domain by an IFFT. The real and imaginary outputs of the IFFT were then each quantized to 5-bits so they could be stored in a lookup table having 5-bit per sample precision. The 30 sample modulated complex time domain sequence derived from the 32-bit frequency domain bit sequence is as follows:

SSI: 06, −7, 8, −2, −12, 15, 1, −15, 8, 7, −7, −4, 12, −4, −7, 7, 8, −15, 1, 15, −12, −2, 8, −7, 6, 2, −16, −15, −16, 2
SSQ: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13,

Where,
SSI is the real components of the modulated complex time domain sequence derived from the 32-bit frequency domain bit sequence SS;
SSQ is the imaginary components of the modulated complex time domain sequence derived from the 32-bit frequency domain bit sequence SS.

The bit sequences determined for L1, L2, L3, L4, and SS advantageously may be stored in a lookup table having only 5-bit per sample precision, yet be scaled to 10-bit per sample precision. Not only does storing the bit sequences with 5-bit per sample precision reduce the memory required to store the sequences, but they may be scaled to a higher bit per sample precision and accurately calibrate a receiver to receive data in a MoCA network with a 40 MHz bandwidth.

In addition to the above described embodiments, the disclosed method and system may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method of transmitting a data packet comprising:
a) generating a preamble derived from one or more of the following bit sequences:
  i) x010101000110xxxxxxx011000000000;
  ii) x1011000111000000011011110xxxxxxxxxxxxx01
      1011100110100101011010;
  iii) x00110110111110100111011111xxxxxxxxxxxxx01
      11010010111110000000101;
  iv) x0000000110001001110100100xxxxxxxxxxxxx10
      110111100001101010111100;
  v) x10000100001101111000001110xxxxxxxxxxxxx11
      00110011101101111110110;
by:
  1) accessing a Z-bit per sample precision lookup table having elements corresponding to modulated complex time domain representations of the bit sequences, and
  2) modulating the data payload using Y-bit per sample precision,
b) appending the preamble to the data packet; and
c) transmitting the data packet and preamble over a communication channel, wherein "x" represents an unused sub-carrier in a transmitted frequency division multiplexed signal, and wherein Y and Z are both greater than 1 and Y is greater than Z.

2. The method of claim 1, wherein generating the preamble further comprises converting the elements from the lookup table to Y-bit per sample precision before appending the preamble to the data packet.

3. The method of claim 1, wherein the elements are stored in the 5-bit per sample lookup table as the following modulated complex time domain sample sequences:

SS: 6, −7, 8, −2, −12, 15, 1, −15, 8, 7, −7, −4, 12, −4, −7, 7, 8, −15, 1, 15, −12, −2, 8, −7, 6, 2, −16, −15, −16, 2;
SSQ: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13;
L1I: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3;
L1Q: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6;
L2I: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8;
L2Q: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15;
L3I: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10;

L3Q: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12;

L4I: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2; and L4Q: 0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15;

wherein SSI and SSQ correspond to the real and imaginary components derived from bit sequence i, wherein L1I and L1Q correspond to the real and imaginary components derived from bit sequence ii, wherein L2I and L2Q correspond to the real and imaginary components derived from bit sequence iii, wherein L3I and L3Q correspond to the real and imaginary components derived from bit sequence iv, and wherein L4I and L4Q correspond to the real and imaginary components derived from bit sequence v.

4. The method of claim 1, wherein Z equals 5.

5. The method of claim 1, wherein Y equals 10.

6. The method of claim 1, wherein generating the preamble further comprises:
a) scaling the elements by a first scale factor, and
b) rounding the scaled elements to conform to the Y-bit per sample precision.

7. A method for transmitting a data packet, comprising:
a) generating a preamble by accessing a lookup table having elements corresponding to a modulated complex time domain representation of a frequency domain bit sequence, the elements are stored in the lookup table with Y-bit per sample precision, wherein a real part of the elements is stored in the lookup table as:
6, −7, 8, −2, −12, 15, 1, −15, 8, 7, −7, −4, 12, −4, −7, 7, 8, −15, 1, 15, −12, −2, 8, −7, 6, 2, −16, −15, −16, 2, and
wherein an imaginary part of the elements is stored in the lookup table as:
−5, 0, 0, 0, −4, −1, 5, 1, −2, 1, 6, 11, −8, −11, −6, −1, 2, −1, −5, 1, 4, 0, 0, 0, 5, 13, 10, 0, −10, −13;
b) converting the elements from the lookup table to a Z-bit per sample precision, wherein Z-bit per sample precision is greater than Y-bit per sample precision;
c) appending the preamble including the modulated complex time domain representation of the frequency domain bit sequence to the data packet, and
d) transmitting the data packet and preamble over the communication channel.

8. The method of claim 7, wherein Y equals 5 and Z equals 10.

9. A method for transmitting a data packet, comprising:
a) generating a preamble by accessing a lookup table having elements corresponding to a modulated complex time domain representation of a frequency domain bit sequence, the elements are stored in the lookup table with Y-bit per sample precision, wherein a real part of the elements is stored in the lookup table as:
−3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3, and wherein an imaginary part of the elements is stored in the lookup table as:
0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6;

b) converting the elements from the lookup table to a Z-bit per sample precision, the Z-bit per sample precision greater than the Y-bit per sample precision;

c) appending the preamble including the modulated complex time domain representation of the frequency domain bit sequence to the data packet; and d) transmitting the data packet and preamble over the communication channel.

10. The method of claim 9, wherein Y equals 5 and Z equals 10.

11. A method for transmitting a data packet, comprising:
a) generating a preamble by accessing a lookup table having elements corresponding to a modulated complex time domain representation of a frequency domain bit sequence, the elements are stored in the lookup table with Y-bit per sample precision, wherein a real part of the elements is stored in the lookup table as:
−16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8, and wherein an imaginary part of the elements is stored in the lookup table as:
0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, 11, −7, 6, −4, −11, −11, 7, 15, 6, 15;

b) converting the elements from the lookup table to a Z-bit per sample precision, the Z-bit per sample precision greater than the Y-bit per sample precision;

c) appending the preamble including the modulated complex time domain representation of the frequency domain bit sequence to the data packet; and d) transmitting the data packet and preamble over the communication channel.

12. The method of claim 11, wherein Y equals 5 and Z equals 10.

13. A method for transmitting a data packet, comprising:
a) generating a preamble by accessing a lookup table having elements corresponding to a modulated complex time domain representation of a frequency domain bit sequence, the elements are stored in the lookup table with Y-bit per sample precision, wherein a real part of the elements is stored in the lookup table as:
12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10; and wherein an imaginary part of the elements is stored in the lookup table as:
0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12;

b) converting the elements from the lookup table to a Z-bit per sample precision, the Z-bit per sample precision is greater than the Y-bit per sample precision;

c) appending the preamble including the modulated complex time domain representation of the frequency domain bit sequence to the data packet; and d) transmitting the data packet and preamble over the communication channel.

14. The method of claim 13, wherein Y equals 5 and Z equals 10.

15. A method for transmitting a data packet comprising:

a) generating a preamble by accessing a lookup table having elements corresponding to a modulated complex time domain representation of a frequency domain bit sequence, the elements stored in the lookup table with Y-bit per sample precision, wherein a real part of the elements is stored in the lookup table as:

−5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2, and wherein an imaginary part of the elements is stored in the lookup table as:

0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15;

b) converting the elements from the lookup table to a Z-bit per sample precision, the Z-bit per sample precision is greater than the Y-bit per sample precision c) appending the preamble including the modulated complex time domain representation of the frequency domain bit sequence to the data packet; and d) transmitting the data packet and preamble over the communication channel.

16. The method of claim 15, wherein Y equals 5 and Z equals 10.

17. A machine readable non-transitory storage medium encoded with program code, wherein when the program code is executed by a processor, the processor performs a method comprising:

a) generating a preamble derived from one or more of the following frequency domain bit sequences:

i) x010101000110xxxxxxx011000000000;

ii) x1011000111000000011011110xxxxxxxxxxxxx01 10111001101001010111010;

iii) x0011011011111010011101111xxxxxxxxxxxxx01 11010010111110000000101;

iv) x00000001100010011101001100xxxxxxxxxxxxx10 11011110000110101011100;

v) x1000010000110111100000110xxxxxxxxxxxxx11 00110011101101111110110;

wherein generating the preamble comprises:
  accessing a lookup table having elements corresponding to a modulated
  complex time domain representation of the frequency domain bit sequences,
wherein the data packet comprises a data payload and the data payload is modulated using Y-bit per sample precision, and
wherein the elements are stored in the lookup table in Z-bit per sample precision, wherein Y and Z are both greater than 1 and Y is greater than Z b) appending the preamble to a data packet; and c) transmitting the data packet and preamble over a communication channel, wherein "x" represents an unused sub-carrier in a transmitted frequency division multiplexed signal.

18. The machine readable non-transitory storage medium of claim 17, wherein generating the preamble further comprises converting the elements from the lookup table to Y-bit per sample precision before appending the preamble to the data packet.

19. The machine readable non-transitory storage medium of claim 18, wherein the frequency domain bit sequences are stored in the lookup table as the following modulated complex time domain sample sequences with 5-bit per sample precision:

SSI: 6, −7, 8, −2, −12, 15, 1, −15, 8, 7, −7, −4, 12, −4, −7, 7, 8, −15, 1, 15, −12, −2, 8, −7, 6, 2, −16, −15, −16, 2;

SSQ: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13;

L1I: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3;

L1Q: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6;

L2I: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8;

L2Q: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15;

L3I: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10;

L3Q: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12;

L4I: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2; and L4Q: 0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15;

wherein SSI and SSQ correspond to the real and imaginary components derived from bit sequence i, wherein L1I and L1Q correspond to the real and imaginary components derived from bit sequence ii, wherein L2I and L2Q correspond to the real and imaginary components derived from bit sequence iii, wherein L3I and L3Q correspond to the real and imaginary components derived from bit sequence iv, and wherein L4I and UQ correspond to the real and imaginary components derived from bit sequence v.

20. A network node, comprising:

a lookup table configured to store one or more of the following modulated complex time domain sample sequences with Y-bit per sample precision:

SSI: 6, −7, 8, −2, −12, 15, 1, −15, 8, 7, −7, −4, 12, −4, −7, 7, 8, −15, 1, 15, −12, −2, 8, −7, 6, 2, −16, −15, −16, 2;

SSQ: −5, 0, 0, 0, −4, −1, 5, 1, −2, 1, 6, 11, −8, −11, −6, −1, 2, −1, −5, 1, 4, 0, 0, 0, 5, 13, 10, 0, −10, −13;

L1I: −3, 3, −5, −14, 11, 11, −9, 0, 0, 0, 12, 6, 5, −7, −16, 2, −5, −4, 8, −2, −1, −4, 5, 15, −13, −7, 9, 0, 12, 8, −7, −8, −10, −8, −7, 8, 12, 0, 9, −7, −13, 15, 5, −4, −1, −2, 8, −4, −5, 2, −16, −7, 5, 6, 12, 0, 0, 0, −9, 11, 11, −14, −5, 3;

L1Q: 0, 6, 7, −5, −3, 12, 5, −8, −13, −12, 1, 1, −5, 13, 12, −9, 1, 10, −8, −10, 1, −5, −12, −9, −12, −7, 2, −3, −8, −8, −6, 1, 0, −1, 6, 8, 8, 3, −2, 7, 12, 9, 12, 5, −1, 10, 8, −10, −1, 9, −12, −13, 5, −1, −1, 12, 13, 8, −5, −12, 3, 5, −7, −6;

L2I: −16, 8, 12, −1, 6, −15, −13, 13, 8, 7, −2, −8, 9, 0, −3, 12, −3, −12, −3, −9, −12, −8, −11, −2, 13, 3, −8, 12, 11, −11, 0, 12, 7, 12, 0, −11, 11, 12, −8, 3, 13, −2, −11, −8, −12, −9, −3, −12, −3, 12, −3, 0, 9, −8, −2, 7, 8, 13, −13, −15, 6, −1, 12, 8;

L2Q: 0, −15, −6, −15, −7, 11, 11, 4, −6, 7, 11, −3, 9, 7, −5, 2, 8, 8, −1, 8, 12, −13, −12, 2, 6, 7, −1, 9, 11, 0, 3, 0, 0, 0, −3, 0, −11, −9, 1, −7, −6, −2, 12, 13, −12, −8, 1, −8, −8, −2, 5, −7, −9, 3, −11, −7, 6, −4, −11, −11, 7, 15, 6, 15;

L3I: 12, 10, 8, 0, 1, 15, 2, −12, 1, 11, 4, −6, 6, 12, −10, −14, −11, −6, 10, −5, −8, 9, −12, −8, 11, −8, −2, 7, −14, −10, 3, 6, 9, 6, 3, −10, −14, 7, −2, −8, 11, −8, −12, 9, −8, −5, 10, −6, −11, −14, −10, 12, 6, −6, 4, 11, 1, −12, 2, 15, 1, 0, 8, 10;

L3Q: 0, 12, 2, 15, 11, −2, 9, 10, 3, −12, −13, −3, −3, 4, 3, −3, −10, −13, 11, 9, −8, 6, 1, 3, 11, −13, −13, 4, 8, 7, 5, 8, 0, −8, −5, −7, −8, −4, 13, 13, −11, −3, −1, −6, 8, −9, −11, 13, 10, 3, −3, −4, 3, 3, 13, 12, −3, −10, −9, 2, −11, −16, −2, −12;

L4I: −5, −2, 6, 11, −4, −12, 10, 7, −15, −3, 2, −9, −8, −1, 15, 8, −10, 11, 11, −7, 4, −5, −15, 0, 0, 1, −2, −5, 7, 6, −2, 0, −1, 0, −2, 6, 7, −5, −2, 1, 0, 0, −15, −5, 4, −7, 11, 11, −10, 8, 15, −1, −8, −9, 2, −3, −15, 7, 10, −12, −4, 11, 6, −2; and L4Q: 0, 15, 10, 15, 13, −5, −10, 3, 6, −4, 11, 6, −15, −1, −11, −12, 14, −4, −13, −8, −13, 4, 1, −14, −15, −12, 6, 8, −1, 3, 3, 4, 0, −4, −3, −3, 1, −8, −6, 12, 15, 14, −1, −4, 13, 8, 13, 4, −14, 12, 11, 1, 15, −6, −11, 4, −6, −3, 10, 5, −13, −15, −10, −15;

wherein SSI and SSQ correspond to the real and imaginary components derived from bit sequence i, wherein L1I and L1Q correspond to the real and imaginary components derived from bit sequence ii, wherein L2I and L2Q correspond to the real and imaginary components derived from bit sequence iii, wherein L3I and L3Q correspond to the real and imaginary components derived from bit sequence iv, and wherein L4I and L4Q correspond to the real and imaginary components derived from bit sequence v;

a processing channel that generates a preamble having Z-bit per sample precision, the preamble including at least one of the modulated complex time domain sample sequences; and a transmitter that transmits the preamble and a data packet over a communication channel.

21. The network node of claim 20, wherein the processing channel includes a scaler that scales the modulated complex time domain sample sequences with Y-bit per sample precision to a complex time domain sample sequence with Z-bit per sample precision.

22. The network node of claim 21, wherein the transmitter includes a digital to analog converter having Z-bit per sample precision.

23. The network node of claim 22, wherein Y equals 5 and Z equals 10.

* * * * *